United States Patent [19]

Keohan

[11] Patent Number: 5,008,146

[45] Date of Patent: Apr. 16, 1991

[54] ZINC-CARBON ANTIFOULING COATING

[75] Inventor: Francis L. Keohan, Plymouth, Mass.

[73] Assignee: Cape Cod Research, Inc., Buzzards Bay, Mass.

[21] Appl. No.: 419,143

[22] Filed: Oct. 10, 1989

Related U.S. Application Data

[63] Continuation of Ser. No. 267,350, Nov. 4, 1988, abandoned.

[51] Int. Cl.$^5$ .............................................. B05D 5/00
[52] U.S. Cl. ................................ 428/328; 427/205; 427/385.5; 428/907; 252/504; 106/1.17; 106/14.21; 106/15.05
[58] Field of Search ............... 427/205, 385.5, 406; 428/907, 328; 252/504; 106/1.17, 14.21, 15.05

[56] References Cited

U.S. PATENT DOCUMENTS

| | | | |
|---|---|---|---|
| 3,202,517 | 8/1965 | Jarboe et al. | 106/14 |
| 3,507,676 | 4/1970 | McMahon | 428/907 X |
| 4,020,200 | 4/1977 | Groszek et al. | 427/416 |
| 4,172,841 | 10/1979 | Danna et al. | 427/393.2 X |
| 4,273,833 | 6/1981 | DeLong | 427/372.2 X |
| 4,482,652 | 11/1984 | Datta | 106/15.05 |
| 4,544,581 | 10/1985 | Pelloski | 427/383.7 |

FOREIGN PATENT DOCUMENTS 58-94459  6/1983  Japan ................................. 428/907

*Primary Examiner*—Shrive Beck

[57] ABSTRACT

An antifouling coating comprising no toxicant. The formulation contains in combination zinc and carbon which in the presence of the aqueous environment render the coating resistant to fouling.

5 Claims, No Drawings

ZINC-CARBON ANTIFOULING COATING

CROSS-REFERENCE TO RELATED APPLICATION

This is a continuation of application Ser. No. 267,350 filed Nov. 4, 1988 and now abandoned.

BACKGROUND OF THE INVENTION

This invention relates to an antifouling coating composition containing the combination of metallic zinc and carbon for producing biocidal substances when contacted by the combination of dissolved oxygen and water. The invention also relates to a method of preventing fouling of a structure which may be or is contacted with water, such as buoys, floating piers, ship bottoms, collecting or discharge water passages to which pestiferous organisms attach themselves.

More specifically, this invention relates to an antifouling coating composition for a structure which may be or is contacted with fresh or seawater, said composition being composed of (a) about 10 to 60% by weight metallic zinc powder,
(b) about 5 to 40% by weight carbon,
(c) the remainder a vehicle comprising film forming and pore forming materials.

There are two types of conventional antifouling coatings, classified according to their mode of action. They are generally known as "soluble matrix" or "contact" types.

In the soluble matrix type the toxicant is dispersed in a binder that is slightly soluble in water. The toxicant is slowly released as the binder dissolves. The rate of dissolution must be carefully controlled since inadequate concentration of poison at the surface will allow attachment of the pestiferous organisms. It is difficult in practice to control the rate of dissolution of the toxicant. In order to achieve long service lives with soluble matrix antifouling coatings, the antifouling agents must be extremely toxic. Typical coating compositions contain copper suboxide, tetramethylthiuram sulfide, zinc dimethyldithiocarbamate, tributyltin oxide, etc. as antifouling agents. The above-exemplified agents have known adverse effects on other living organisms. Soluble-matrix type coatings are now being banned because of the resulting secondary pollution to the aqueous environment.

The contact type of antifouling composition is formulated at a very high toxicant volume, such that the toxicant particles in the disperse phase are in contact with each other in the dry coating. Sixty percent by weight cuprous oxide is a typical toxicant because cupric ions are extremely toxic to aqueous life. In the case of barnacles about 10 ug of copper per $cm^2$ per day is sufficient to prevent their attachment. The binder is largely insoluble in water, so that when the dissolution of the toxicant takes place a porous film of the coating binder remains on the surface. The binder is not entirely insoluble, and the balance between binder solubility/insolubility plays a critical role in controlling the rate of toxicant release. This is difficult to control, especially since various organisms exhibit different degrees of sensitivity to poison. Even if this problem could be solved, their remains the problem that the toxicants commonly used in contact type coatings persist and ultimately produce adverse effects on other living organisms in the aqueous environment.

I have made investigations in order to develop a new type of antifouling coating composition for the above-exemplified water-contacting structures, which can overcome the aforesaid troubles of secondary pollution which the conventional antifouling compositions essentially have. Consequently, I have succeeded in developing an antifouling coating which is quite free from any antifouling agent causing environmental pollution and can exhibit an excellent antifouling effect against pestiferous organisms.

SUMMARY OF THE INVENTION

My investigations have led to the discovery that an inorganic composition consisting essentially of metallic zinc and carbon held in a contact type coating shows excellent antifouling effect against aqueous organisms in spite of not containing a component generally called an antifouling agent, and has excellent water resistance and satisfactory adhesion strength with respect to a structure which may or is contacted with water or seawater.

No exact mechanism by which this unexpected result is obtained has been elucidated. The result is especially surprising since when utilized separately neither zinc nor carbon are useful as antifouling agents. Metallic zinc is commonly employed in primers for the cathodic protection of iron structures. Said primers are valueless as antifouling coatings. Metallic zinc is also widely used for the cathodic protection of ship hulls but metallic zinc by itself is valueless as an antifouling coating.

Carbon in various forms is widely used as a pigment in paints and coatings. It is found in commercial antifouling coatings and when in the graphitic form it helps provide a smooth surface to the coating. Carbon is recognized as being chemically inert in the aqueous environment. There are commercial examples of coatings comprising metallic zinc dust and carbon black. However, there appears to be no description about the antifouling effect of said composition nor is there disclosure which can suggest such a new use of said composition.

In general, the invention features a coating for providing antifouling properties to a surface, said coating comprising the combination of metallic zinc and carbon.

With time and exposure to the aqueous environment the zinc slowly dissolves in the form of zinc compounds. Thus it is important to use a coating composition rich in zinc. Levels above 60% by weight result in coatings which are difficult to apply. Levels below 10% by weight have relatively short operating life times. The particle size of the zinc dust used has an important influence on the quality of the coating. Particle size less than three microns produces harder and more abrasion resistant coatings but results in a much greater tendency to mud crack (fine microcracks, produced on the surface of zinc rich coatings during drying of the binder). Larger particle size zinc dust does not cause mud cracking but decreases hardness and abrasion resistance.

In the present invention, zinc must be of sufficient purity to be effective in the aqueous environment and not provide damaging heavy metals to said environment. A preferred composition has the maximum weight percentages as follows: 0.006 Pb, 0.0014 Fe, 0.06 Cd, 0.005 Cu, and 0.3 Al. The maximum iron may be increased to 0.003 when minimum cadmium is 0.025.

In the present invention, carbon is chosen from the group consisting of graphite, carbon black, activated charcoal and acetylene black. Generally a high surface area, high structure carbon with a minimum volatile content is preferred. Chopped graphite fibers may be added to the formulation to assist in achieving a tough durable coating. Loadings of 5 to 40% by weight are preferred where the actual choice depends on the wetting characteristics of the vehicle employed. For systems that wet poorly, (vinyls, acrylics, for example) lower loadings are preferred. For good wetting vehicles, (long oil alkyd, for example) loadings can be increased.

Great numbers of combinations of solvents and binders will be immediately recognized as available by one skilled in the art. Generally, the zinc and carbon of this invention may be together thought of as the toxicant and as pigments and the rest of the coating may be considered the vehicle. A discussion and compilation of various organic vehicles may be found in U.S. pat. no. 2,579,610. A discussion and compilation of various inorganic vehicles may be found in U.S. pat. nos. 3,067,045, 3,320,082, and 3,453,122.

Typical compositions for use as the contact type antifouling vehicle of this invention are:

|  | % by weight |
| --- | --- |
| Film forming resin | 5-20 |
| Pore forming agent | 5-20 |
| Plasticizer | 2-8 |
| Ketone solvent | 40-70 |
| Aromatic solvent | 0-30 |

Insoluble film forming resins are preferably chosen from the group consisting of resins of the vinyl, alklyd, urethane, silicone, acrylonitrile, acrylate, epoxy, and chlorinated elastomer type.

The surprising technical advance achieved by the coating composition according to the invention is apparent from the following examples which further explain but do not limit the invention.

EXAMPLE 1

Known zinc-containing compositions have very limited activity underwater for preventing algal growth and no activity for preventing the attachment of barnacles, tube worms or sea squirts. Carbon is recognized in prior art as an inert filler and has no known biological activity. Thus the unexpected and hitherto unrecognized effectiveness of a composition comprising metallic zinc and carbon is very surprising. In order to attempt to elucidate the exact mechanism for the remarkable and long-lived antifouling behavior of my compositions, a number of experiments were performed.

Compositions containing only zinc oxide and carbon in an insoluble film-forming resin were tested in the Atlantic Ocean during the summer months. After 30 days these compositions were badly fouled. This suggests that the mechanism might not be directly related to the known antialgal properties of zinc-containing compositions, but rather might be due to a galvanic effect involving metallic zinc. This mode of action differs from soluble matrix or contact types.

One possible explanation of the effectiveness of my method involves formation of toxic materials from the environment by means of two chemical steps. The first is galvanic in nature and involves the electrochemical reduction on the surfaces of the carbon of dissolved oxygen to form hydrogen peroxide. The electrons needed for this reduction come from the metallic zinc. The second step involves reaction of some of the peroxide with zinc ions to form, in the presence of organic materials found in natural waters, complex water-insoluble complexes with antibacterial powers. U.S. pat. no. 4,172,841 illustrates the antibacterial activity of organic zinc peroxides.

This explanation of the mechanism of the antifouling activity of the coatings of my invention requires the continuous formation of peroxides when the coating is underwater. The following example illustrates that this does in fact take place in neutral and slightly basic aerated water.

Into a 50 mL beaker was charged 1.05 grams of tall oil rosin, 0.45 grams of boiled linseed oil, 0.63 grams of toluene and 0.02 grams of cobalt naphthenate (6% cobalt). The mixture was stirred at ambient temperature until a coating vehicle was obtained. According to this invention, the combination of 1.50 grams of zinc powder ($-100$ mesh) and 0.75 grams of carbon black (sterling Black, Cabot Co., Boston, Mass. 02110) were stirred into said vehicle until a homogeneous suspension was obtained.

The resulting formulation was applied to a 8 cm $\times$ 8 cm fiberglass sheet and allowed to air dry at ambient temperature for a day. The dry coating thickness was 0.5 millimeters.

Said coated sheet was immersed in 500 mL of 2w%NaCl in deionized water. The solution was aerated by means of a porous glass frit connected through a tube to a small air pump. After 24 hours of aeration at ambient temperature a 1 mL sample of the solution was analyzed for hydrogen peroxide by titration with standard potassium permanganate solution. This measurement was performed after 48 hours and 120 hours of immersion as well with the results shown below:

| Immersion Time, hrs | 0 | 24 | 48 | 120 |
| --- | --- | --- | --- | --- |
| Hydrogen Peroxide, ppm | 0 | 1 | 6 | 14 |

After 120 hours the original immersion solution was discarded, the coated panel rinsed with deionized water and reimmersed in 500 mL of a pH of 8.0, 0.1 molar phosphate buffer solution. The solution was aerated continuously at ambient temperature for 65 hours and periodically analyzed for hydrogen peroxide concentration. The results of the analyses are:

| Immersion Time, hrs | 0 | 18 | 40 | 65 |
| --- | --- | --- | --- | --- |
| Hydrogen Peroxide, ppm | 0 | 18 | 29 | 24 |

EXAMPLE 2

A coating vehicle was prepared as follows: Into a 50 mL beaker was charged 1.00 grams of calcium resinate, 0.44 grams of boiled linseed oil, 0.16 grams of a vinyl chloride-vinyl acetate-vinyl alcohol terpolymer, 0.02 grams of cobalt naphthenate (6% cobalt), 0.03 grams of zirconium octoate (6% zirconium), 2.50 grams of 2-butanone, and 1.50 grams of toluene. This vehicle was stirred at ambient temperature until all solids dissolved.

Said coating vehicle was prepared a total of five times. These five solutions were stirred at ambient temperature with the following ingredients to form the following slurrys:

| Slurry | Solid Ingredients |
|--------|-------------------|
| A | 2.3 g of attapulgite clay |
| B | 1.6 g of −100 mesh zinc powder |
| C | 0.72 g Cabot Sterling ® carbon black |
| D | 1.6 g aluminum powder + 0.72 g Cabot Sterling ® carbon black |
| E | 1.6 g of −100 mesh zinc powder + 0.72 g Cabot Sterling ® carbon black + 0.08 g of chopped graphite fibers |

Each slurry was spread evenly over the surface of a 8 cm × 8 cm fiberglass sheet and the coated sheet allowed to dry in air at ambient temperature for one day. The dry coating thickness was between 0.5–1.0 mm in each case.

Said five coated panels were mounted on a wooden board with plastic fasteners and the assembly immersed for 93 days in the Atlantic Ocean during the summer months in a temperate region (Fairhaven, Mass.) to test the effectiveness of said five coatings.

After 93 days, only the sheet coated according to the invention with slurry E was entirely free from fouling organisms. Control sheets A, B, C, and D were heavily encrusted with a broad variety of pestiferous organisms including barnacles, tube worms, sea squirts and weeds.

EXAMPLE 3

Example 2 was repeated with a different vehicle, different controls and a different test location and the results were essentially the same. Only the combination of zinc and carbon together produced an antifouling coating.

Specifically into a 50 mL beaker was charged 1.26 grams of zinc resinate, 0.54 grams of boiled linseed oil, 0.20 grams of a vinyl chloride-vinyl acetate-vinyl alcohol terpolymer, 0.03 grams of cobalt naphthenate (6% cobalt), and 0.04 grams of zirconium octoate (6% zirconium), 3.00 grams of 2-butanone, and 1.00 grams of toluene. The mixture was stirred at ambient temperature until all solids were dissolved. Into the resulting solution was hand-blended 1.50 grams of zinc powder (−325 mesh), 1.40 grams of Cabot Sterling$^R$ Black R-V8029, and 0.10 grams of chopped graphite fibers (length <1 mm) so that a homogeneous mixture was obtained.

This coating formulation made in accordance with this invention was spread evenly over the bottom surface of a fiberglass 10-foot rowboat in 8 cm × 8 cm patches along with an iron powder and Cabot Sterling$^R$ Black R-V8029-filled coating, and a non-carbon black, zinc powder-filled coating which with the uncoated areas of the boat bottom served as controls. All coatings were allowed a minimum of 24 hours to air dry at ambient temperature before sea immersion. The dry coating thickness was between 0.5–1.0 mm in each case.

The bottom-coated vessel was moored for 36 days in the ocean during the summer months in a temperate region (West Falmouth Harbor, Mass.) to test the effectiveness of these coatings.

After the test, the surface of the panel coated with the coating comprising both zinc and carbon was free from fouling organisms. The control samples, however, were heavily encrusted with a variety of fouling media including barnacles, tube worms, sea squirts and vegetative growth.

While only a limited number of embodiments of the present invention are disclosed and described herein, it will be readily apparent to persons skilled in the art that numerous changes and modifications may be made without departing from the scope of the invention. Accordingly, the foregoing disclosure and description thereof are for illustrative purposes only and do not in any way limit the invention which is defined only by the claims which follow.

What is claimed is:

1. A method for rendering underwater structures resistant to fouling by pestiferous organisms which comprises contacting said structures with a composition comprising 10 to 60 percent by weight metallic zinc in combination with 5 to 40 percent carbon.

2. A method according to claim 1 wherein said metallic zinc is powder with a mean particle size greater than 3 microns.

3. A method according to claim 1, wherein said metallic zinc contains by weight percent no more than 0.006 lead, 0.0014 iron, 0.06 cadmium, 0.005 copper and 0.3 aluminum.

4. A method according to claim 1, wherein said carbon is selected from the group consisting of graphite, carbon black, activated charcoal and acetylene black.

5. A ship's hull provided with an antifouling coating according to the method recited in claim 1.

* * * * *